(12) United States Patent
Bos-Plachez et al.

(10) Patent No.: US 12,380,875 B2
(45) Date of Patent: Aug. 5, 2025

(54) SPEECH SYNTHESIS WITH FOREIGN FRAGMENTS

(71) Applicant: Cerence Operating Company, Burlington, MA (US)

(72) Inventors: Corinne Bos-Plachez, Baisieux (FR); Vito Quinci, Turin (IT); Alina Lenhardt, Ulm (DE); Benjamin Vincent Marcel Picart, Merelbeke (BE); Martine Marguerite Staessen, Wervik (BE); Athos Toniolo, Turin (IT)

(73) Assignee: Cerence Operating Company, Burlington, MA (US)

( * ) Notice: Subject to any disclaimer, the term of this patent is extended or adjusted under 35 U.S.C. 154(b) by 309 days.

(21) Appl. No.: 17/842,986

(22) Filed: Jun. 17, 2022

(65) Prior Publication Data

US 2023/0410790 A1 Dec. 21, 2023

(51) Int. Cl.
*G10L 13/08* (2013.01)
*G06F 40/263* (2020.01)
(Continued)

(52) U.S. Cl.
CPC .......... *G10L 13/086* (2013.01); *G06F 40/263* (2020.01); *G06F 40/279* (2020.01); *G10L 13/047* (2013.01); *G10L 13/06* (2013.01)

(58) Field of Classification Search
CPC ..... G10L 13/086; G10L 13/047; G10L 13/06; G06F 40/279; G06F 40/263
See application file for complete search history.

(56) References Cited

U.S. PATENT DOCUMENTS 8,768,704 B1 * 7/2014 Fructuoso ............. G06F 40/284
704/277
2006/0265220 A1 * 11/2006 Massimino ............. G10L 13/08
704/235
(Continued)

FOREIGN PATENT DOCUMENTS

EP 2595143 A1 5/2013

OTHER PUBLICATIONS

Xavi Gonzalvo, Monika Podsiadlo, "Text-To-Speech with cross-lingual Neural Network-based grapheme-to-phoneme models", Interspeech 2014 10.214237/Interspeech2014-177 (Year: 2014).*
(Continued)

*Primary Examiner* — Pierre Louis Desir
*Assistant Examiner* — Daniel W Chung
(74) *Attorney, Agent, or Firm* — Occhiuti & Rohlicek LLP

(57) ABSTRACT

A method for synthesizing speech from a textual input includes receiving the textual input, the textual input including native words in a native language and foreign words in a foreign language, and processing the textual input to determine a phonetic representation of the textual input. The processing includes determining a native phonetic representation of the of the native words, and determining a nativized phonetic representation of the foreign words. Determining the nativized phonetic representation includes forming a foreign phonetic representation of the foreign words using a foreign phoneme set, and mapping the foreign phonetic representation to the nativized phonetic representation according to a model of a native speaker's pronunciation of foreign words.

17 Claims, 6 Drawing Sheets

(51) Int. Cl.
*G06F 40/279* (2020.01)
*G10L 13/047* (2013.01)
*G10L 13/06* (2013.01)

(56) References Cited

U.S. PATENT DOCUMENTS

2011/0218806 A1* 9/2011 Alewine ............... G10L 15/063
                                              704/E13.011
2013/0132069 A1* 5/2013 Wouters ................. G10L 13/06
                                              704/8
2016/0358596 A1 12/2016 Singh et al.

OTHER PUBLICATIONS

Gonzalvo, Xavi, and Monika Podsiadlo. "Text-To-Speech with cross-lingual Neural Network-based grapheme-to-phoneme models." (2014).
International Search Report and Written Opinion, PCT Application No. PCT/IB2022/000417, mailed Jan. 16, 2023 (12 pages).

* cited by examiner

| ENGLISH Phoneme | IPA equiv. | Example Text | Example Ph. |
|---|---|---|---|
| A | ɑ | c(a)r | 'kAR+ |
| E | ɛ | b(e)d | 'bEd |
| i | i | b(ea)t | 'bit |
| I | ɪ | b(i)t | 'bIt |
| O | ɔ | b(ough)t | 'bOt |
| u | u | b(oo)t | 'but |
| $ | ə | (a)bout | $.'ba&Ut |
| @ | æ | m(a)p | 'm@p |
| A+ | ɒ | p(o)t | 'pA+t |
| ^ | ʌ | b(u)t | 'b^t |
| U | ʊ | b(oo)k | 'bUk |
| EO | ɜ | t(ur)n | 'tEOR+n |
| I&$ | ɪə | h(ere) | 'hI&$R+ |
| E&$ | ɛə | th(ere) | 'DE&$R+ |
| U&$ | ʊə | t(our) | 'tU&$R+ |
| e&I | eɪ | b(ai)t | 'be&It |
| O&I | ɔɪ | b(oy) | 'bO&I |
| a&I | aɪ | b(uy) | 'ba&I |
| a&U | aʊ | d(ow)n | 'da&Un |
| o&U | oʊ | sh(ow) | 'So&U |
| j | j | (y)ou | 'ju |
| w | w | (w)it | 'wIt |
| p | p | (p)an | 'p@n |
| b | b | (b)oy | 'bO&I |
| t | t | (t)an | 't@n |
| d | d | (d)ay | 'de&I |
| k | k | (c)an | 'k@n |
| g | g | (g)ot | 'gA+t |
| f | f | (f)ine | 'fa&In |
| v | v | (v)ine | 'va&In |
| s | s | (s)in | 'sIn |
| z | z | (z)one | 'zo&Un |
| S | ʃ | (sh)ine | 'Sa&In |
| Z | ʒ | vi(s)ion | 'vI.Zn% |
| h | h | (h)ead | 'hEd |
| m | m | (m)y | 'ma&I |
| n | n | (n)o | 'no&U |
| nK | ŋ | so(ng) | 'sA+nK |
| I | i | (i)et | 'IEt |
| ? | ʔ | (')eat | '?it |
| T | θ | (th)in | 'TIn |
| D | ð | (th)at | 'D@t |
| R+ | ɹ | (r)ide | 'R+a&Id |
| n% | n̩ | butt(on) | 'b^.tn% |
| l% | l̩ | bott(le) | 'bA+.tl% |
| t&S | t͡ʃ | (ch)urch | 't&SEOR+t&S |
| d&Z | d͡ʒ | (j)ungle | 'd&Z^nK.gl% |
| . | | syllable break | |
| ' | | primary stress | |

| FRENCH Phoneme | IPA equiv. | Example Text | Example Ph. |
|---|---|---|---|
| a | a | c(a)p | 'kap |
| A | ɑ | p(â)te | 'pAt |
| e | e | (é)lément | e.le.'mA%~ |
| E | ɛ | tr(è)s | 'tRE |
| i | i | m(i)nute | mi.'nyt |
| o | o | (eau) | 'o |
| O | ɔ | m(o)rte | 'mORt |
| u | u | t(ou)r | 'tuR |
| y | y | m(u)r | 'myR |
| $ | ə | l(e) | 'l$ |
| e+ | ø | d(eu)x | 'de+ |
| A%~ | ɑ̃ | bl(an)c | 'blA%~ |
| O%~ | ɔ̃ | b(on) | 'bO%~ |
| E%~ | ɛ̃ | v(in) | 'vE%~ |
| E+%~ | œ̃ | br(un) | 'bRE+%~ |
| E+ | œ | (oeu)vre | 'E+.vR$ |
| j | j | bri(ll)er | bRi.'je |
| w | w | (ou)i | 'wi |
| p | p | (p)as | 'pA |
| b | b | (b)as | 'bA |
| t | t | (t)as | 'tA |
| d | d | (d)e | 'd$ |
| k | k | (c)anne | 'kan |
| g | g | (g)omme | 'gOm |
| f | f | (f)aim | 'fE%~ |
| v | v | (v)oi | 'vOI |
| s | s | (s)auce | 'sos |
| z | z | (z)éro | ze.'Ro |
| S | ʃ | (ch)arme | 'SaR.m$ |
| Z | ʒ | (j)ardin | ZaR.'dE%~ |
| m | m | (m)ot | 'mo |
| n | n | (n)ous | 'nu |
| nK | ŋ | smoki(ng) | smO.'kinK |
| l | l | (l)a | 'la |
| ? | ʔ | anti-(h)arpon | A%~.ti.?aR.'pO%~ |
| n~ | ɲ | a(gn)eau | a.'n~o |
| R | ʁ | (r)ond | 'RO%~ |
| h\ | ɥ | l(u)i | 'h\i |
| . | | syllable break | |
| ' | | primary stress | |

| FRENCH+ Phoneme | IPA equiv. | Example Text | Example Ph. |
|---|---|---|---|
| h | h | (h)ead | 'hEd |
| R+ | ɹ | (r)ide | 'R+a&Id |

FIG. 6

SPEECH SYNTHESIS WITH FOREIGN FRAGMENTS

This invention relates to synthesis of speech with foreign fragments.

Text-to-speech (TTS) systems synthesize speech waveforms from textual input. Some conventional TTS systems process textual input to determine phonetic transcriptions of the words or subsets of the words (i.e., letters or groups of letters termed "graphemes") in the textual input. The phonetic transcriptions are provided to a synthesizer that converts the phonetic transcriptions into speech waveforms that can be output using, for example, a loudspeaker.

Certain textual inputs to TTS systems include fragments of one or more words in in a language that is in a second language. An example of such a textual input that is "J'ai lu Harry Potter hier" where the TTS system is configured to synthesize native French-language text as would be spoken by a French speaker, but Harry Potter is foreign-language text because it is the proper name of a fictional British wizard. One approach may be to ignore the change of language and use the same synthesis rules for the whole input. Another approach may be to switch to between French and English synthesis rules (i.e., as if switching between a native French and a native English speaker mid-sentence). However, such approaches may not produce natural sounding synthesized speech.

SUMMARY OF THE INVENTION

In a general aspect, an approach to speech synthesis accepts text that has a foreign language fragment and produces a synthesized waveform that pronounces the native language text as spoken by a native speaker and pronounces the foreign language fragment in a manner that would be pronounced by the native speaker, which may not correspond to a "correct" pronunciation of the foreign language fragment by a speaker of that foreign language.

Some TTS systems may, for example, identify that a text input includes both French and English words and then use French phonemes to synthesize the French words and English (e.g., British English) phonemes to synthesize the English words using pronunciation rules that are native to each of the languages. One drawback of this technique is that the synthesized speech may sound unnatural because midway through the sentence it seems that a French speaker suddenly switches over to speaking perfect English and then switches back to speaking perfect French. Other techniques may replace English phonemes for the textual input with their closest French equivalents, or may use French grapheme-to-phoneme rules to synthesize the English Fragment. The resulting synthesized speech may sound unnatural because aspects of the text may be unnaturally omitted from the English part of the synthesized speech.

Aspects described herein address the above-described drawbacks of conventional techniques by synthesizing foreign language text embedded in a native language textual input in a way that imitates the way a native language speaker would pronounce the foreign language text. For example, many native French speakers are at least somewhat proficient English speakers. Even though the French language doesn't include the h phoneme, those French speakers recognize that the "H" in the name "Harry" is pronounced in the English language and make a (likely imperfect) attempt to pronounce the "H" when saying "Harry." In effect, those native French speakers are using an augmented French phoneme set to pronounce English words. Aspects described herein would imitate the French speaker's attempt at pronouncing the "H" in "Harry" by using an augmented French phoneme set that includes extra phonemes that French speakers use when pronouncing English words, resulting in more natural and realistic sounding synthesized speech.

In a general aspect, a method for synthesizing speech from a textual input includes receiving the textual input, the textual input including native words in a native language and foreign words in a foreign language, and processing the textual input to determine a phonetic representation of the textual input. The processing includes determining a native phonetic representation of the of the native words, and determining a nativized phonetic representation of the foreign words. Determining the nativized phonetic representation includes forming a foreign phonetic representation of the foreign words using a foreign phoneme set, and mapping the foreign phonetic representation to the nativized phonetic representation according to a model of a native speaker's pronunciation of foreign words.

Aspects may include one or more of the following features.

The native phonetic representation may include phonemes from a native phoneme set. The nativized phonetic representation may include phonemes from a native phoneme set. The nativized phonetic representation may include phonemes from a second set of phonemes different from the native phoneme set. The second set of phonemes may include a phoneme set for the foreign language.

The mapping of the foreign phonetic representation to the nativized phonetic representation may use contextual information associated with the foreign phonetic representation. The contextual information may include a grapheme representation of the foreign text associated with the foreign phonetic representation. The contextual information may include an alignment of graphemes in the grapheme representation of the foreign text to phonemes in the foreign phonetic representation. The contextual information may include location information of phonemes in the foreign phonetic representation.

The model of the native speaker's pronunciation of foreign words may be based on training data comprising foreign textual phrases and phonetic transcriptions of a native speaker's pronunciation of the foreign textual phrases. At least some of the native speaker's pronunciations of foreign textual phrases may be mispronunciations. The method may include providing a combination of the native phonetic representation of the of the native words and the nativized phonetic representation of the foreign words to a waveform synthesizer for synthesis of a speech waveform. The method may include synthesizing the speech waveform based on the combination of the native phonetic representation of the of the native words and the nativized phonetic representation of the foreign words using the waveform synthesizer.

The method may include configuring a neural network according to the model of a native speaker's pronunciation of foreign words. Mapping the foreign phonetic representation to the nativized phonetic representation according to the model of a native speaker's pronunciation of foreign words may include applying one or more mapping rules. The method may include identifying the foreign words in the textual input.

In another general aspect, a system for synthesizing speech from a textual input, the system includes an input for receiving the textual input, the textual input including native words in a native language and foreign words in a foreign language and one or more processors configured to process the textual input to determine a phonetic representation of the textual input. The processing includes determining a native phonetic representation of the of the native words, and determining a nativized phonetic representation of the foreign words. Determining the nativized phonetic representation includes forming a foreign phonetic representation of the foreign words using a foreign phoneme set, and mapping the foreign phonetic representation to the nativized phonetic representation according to a model of a native speaker's pronunciation of foreign words.

In another general aspect, software stored in a non-transitory form on a computer-readable medium includes instructions for causing a computing system to synthesize speech from a textual input including to receive the textual input, the textual input including native words in a native language and foreign words in a foreign language and process the textual input to determine a phonetic representation of the textual input. The processing includes determining a native phonetic representation of the of the native words, and determining a nativized phonetic representation of the foreign words. Determining the nativized phonetic representation includes forming a foreign phonetic representation of the foreign words using a foreign phoneme set and mapping the foreign phonetic representation to the nativized phonetic representation according to a model of a native speaker's pronunciation of foreign words.

In another general aspect, a method for determining configuration data for configuring a module for mapping a foreign phonetic representation to a nativized phonetic representation includes receiving training data comprising a plurality of textual representations of foreign language words or phrases and a corresponding plurality of reference phonetic representations of the foreign language words or phrases and processing the training data to form the configuration data.

Aspects may include one or more of the following features.

Processing the training data may include for each textual representation of a foreign language word or phrase forming a foreign phonetic representation of the foreign word or phrase using a foreign phoneme set, mapping the foreign phonetic representation to the nativized phonetic representation according to using a model of a native speaker's pronunciation of foreign words, determining a difference between the nativized phonetic representation and a reference phonetic representation corresponding to the foreign language word or phrase, and updating the model of the native speaker's pronunciation of foreign words based at least in part on the determined difference.

An advantage of training a mapping from a correct foreign pronunciation to a pronunciation in the target language, as compared for example to training a full grapheme-to-phoneme mapping that maps foreign text to the target phoneme set, may be that relatively less training data is needed to represent the manner in which native speakers "nativize" the foreign fragments. Another advantage arises when using graphemes as part of the method of nativizing the foreign fragments because attributes of the foreign language pronunciation such as vowel coloring (e.g., very short vowel phonemes such as schwa $) may be lost in the English phonetic transcription. Such attributes can be restored by using the graphemes as part of nativizing the foreign fragments.

Another advantage may be that different mappings can be trained for different target users. For example, speakers that live in a generally bilingual area may pronounce the foreign fragments more closely to their correct foreign form as compared to speakers from an area where that foreign language is not spoken. To accommodate "natural" synthesis of foreign fragments to the users from such different areas, different mappings may be used.

Other features and advantages of the invention are apparent from the following description, and from the claims.

BRIEF DESCRIPTION OF THE DRAWINGS

FIG. 6 is a table of phoneme definitions.

DETAILED DESCRIPTION

1 Overview

Figure 1:
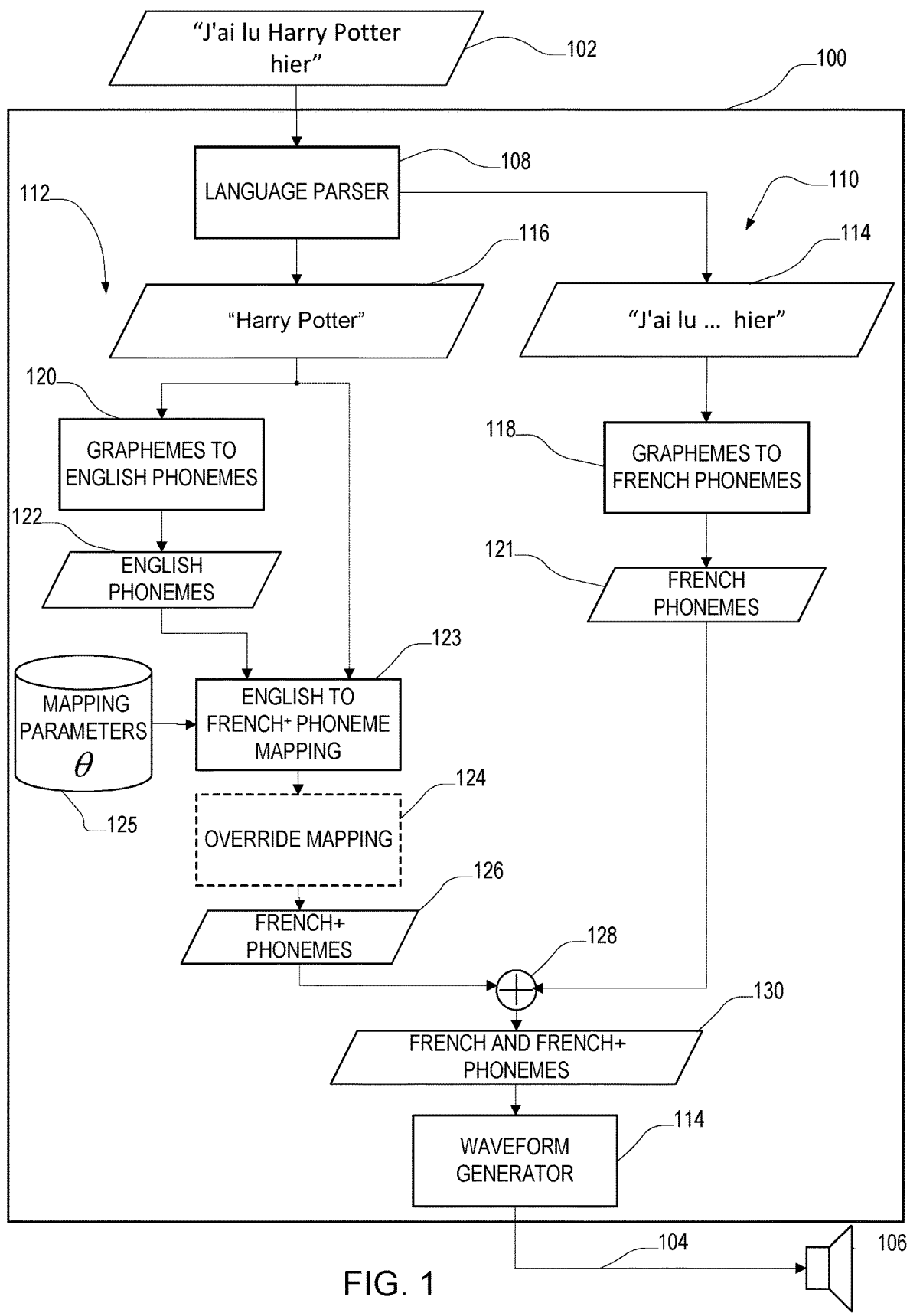
FIG. 1 is a text-to-speech synthesis system.

Referring to FIG. 1, a text-to-speech synthesis system 100 is configured to receive textual input 102 and to process the textual input to generate a synthesized speech waveform 104 for presentation using a loudspeaker 106. The textual input to the system 100 includes both words in a native language and words in a foreign language. Very generally, the system 100 is configured to generate a synthesized speech waveform from such textual input that pronounces the native language words in the textual input as a native speaker would and imitates how a native speaker would pronounce (and possibly mispronounce) the foreign language words in the textual input. As a result, the synthesized speech waveform 104 sounds more natural to a native language listener. For the sake of simplicity, the remainder of this document uses the French language as the native language and the English language as the foreign language. However, it is noted that the described examples are not limited to any two languages.

In some examples, the system 100 includes a language parser 108, a French language processing pipeline 110, an English language processing pipeline 112, and a waveform generator 114. The language parser identifies French words or phrases 114 in the textual input 102 and identifies English words or phrases 116 in the textual input 102. The French words or phrases 114 are provided to and processed by the French language processing pipeline 110 and the English words or phrases 116 are provided to and processed by the English language processing pipeline 116. The outputs of the French language processing pipeline 112 and the English language processing pipeline 112 are combined and provided to the waveform generator 114, which processes the combined output to generate the synthesized speech waveform 104.

The French language processing pipeline 110 includes a French grapheme-to phoneme (G2P) module 118, which identifies graphemes (i.e., letters or groups of letters) in the French words or phrases 114 and determines French language phonemes associated with the identified graphemes. The output of the graphemes to French phonemes module 118 is a sequence of French phonemes 121 corresponding to the French words or phrases 114.

The English language processing pipeline 112 processes the English words or phrases 116 to ultimately generate a sequence of phonemes in a "French⁺" phoneme set. In general, this phoneme set is denoted "French⁺" to account for phoneme set including French phonemes and possibly additional phonemes that a native French speaker would use when attempting to pronounce English words but that may not be required to pronounce French words. In some examples, the additional phonemes are existing English phonemes and/or new phonemes unique to French speakers attempting to pronounce English words. The English language processing pipeline 112 includes a graphemes to English phonemes module 120, an English to French+ phoneme mapping module 123, and an optional override mapping module 124.

The graphemes to English phonemes module 120 identifies graphemes in the English words or phrases 116 and determines English language phonemes associated with the identified graphemes. The output of the graphemes to English phonemes module 120 is a sequence of English phonemes 122 corresponding to the English words or phrases 116.

The sequence of English phonemes 122 (and optionally the graphemes associated with the English words or phrases 116 and aligned to the English phonemes) are provided to the English to French+ phoneme mapping module 123, which maps the sequence of English phonemes 122 into a sequence of French+ phonemes 126 (as is described in greater detail below). In some examples, the English to French+ phoneme module 123 is implemented as a neural network that is parameterized by mapping parameters, θ 125. Optionally, the sequence of French+ phonemes are processed by the override mapping module 124 to override certain phoneme mappings using override rules (as is described in greater detail below).

The sequence of French phonemes 121 and the sequence of French+ phonemes 126 are provided to a combiner 128, which combines the two sequences of phonemes according to the order of the words and phrases in the textual input 102 to generate the combined French and French+ phonemes 130. The combined French and French+ phonemes 130 are proved to the waveform generator 114, which processes the phoneme sequence to generate the synthesized speech waveform 104.

2 Example

Figure 2:
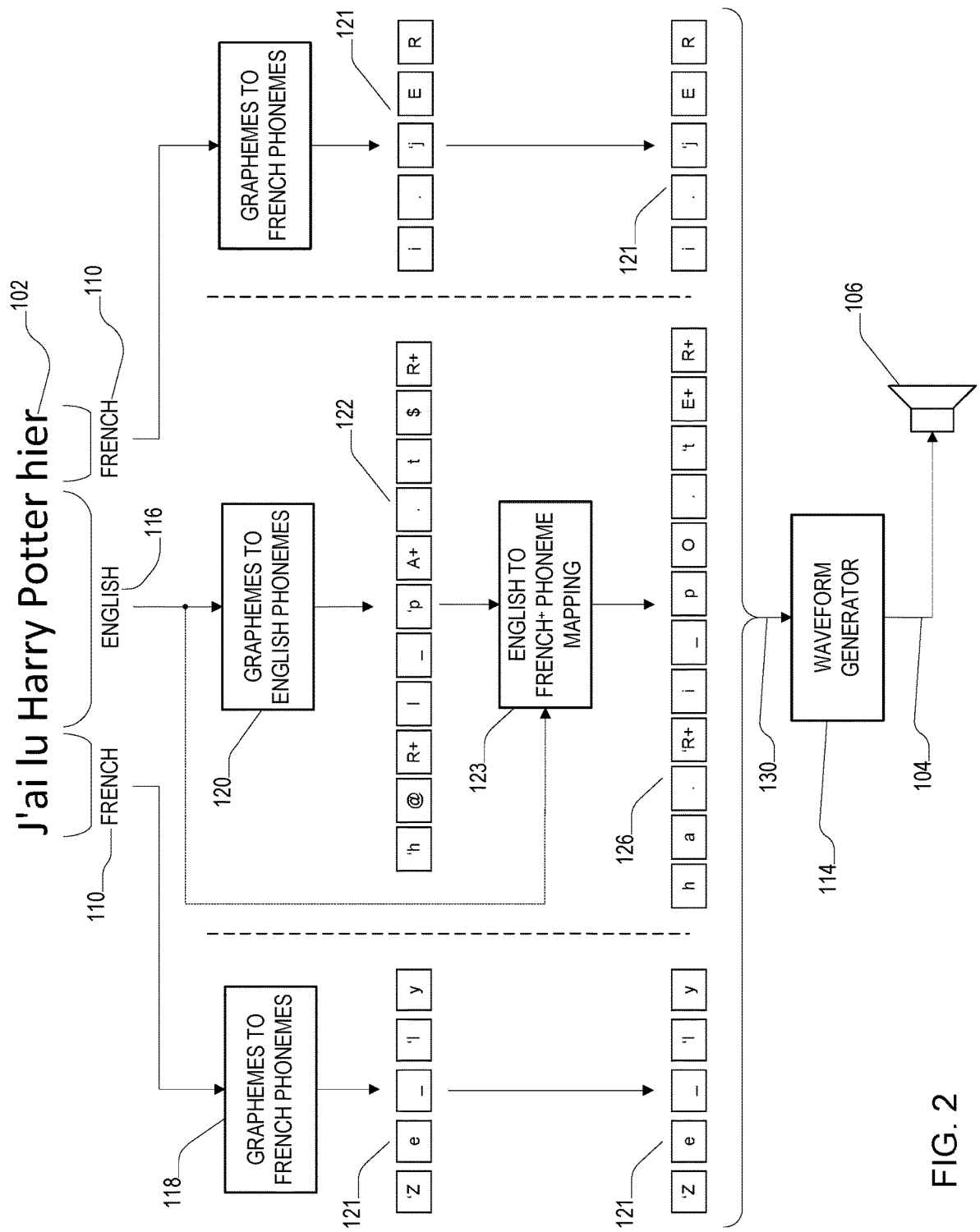
FIG. 2 is a detailed example of the text-to-speech synthesis system's operation.

Referring to FIG. 2, the system 100 receives the textual input 102 "J'ai lu Harry Potter hier" and processes the textual input using the language parser 108 to identify the words "J'ai lu" and "hier" as the French words or phrases 110 and identify the words "Harry Potter" as the fragment of English words or phrases 116.

The French words or phrases 110, "J'ai lu" and "hier" are provided to the graphemes to French phonemes module 118 (shown twice in FIG. 2 for the sake of simplicity). The graphemes to French phonemes module 118 processes "J'ai lu" to generate the sequence of French phonemes 121 'Z e _'l y (FIG. 6 includes the definition of the English, French, and French+ phonemes used herein for reference). The graphemes to French phonemes module 118 processes "hier" to generate the sequence of French phonemes i. 'j E R.

The English words or phrases 116, "Harry Potter" are provided to the graphemes to English phonemes module 120. The graphemes to English phonemes module 120 processes "Harry Potter" to generate the sequence of English phonemes 122 'h @ R+ I _'p A+. t $ R+. The sequence of English phonemes 122 (and optionally the associated English graphemes) are provided to the English to French+ phoneme mapping module 123. The English to French+ phoneme mapping module 123 maps the sequence of English phonemes 122 to a sequence of French+ phonemes 126 h a. 'R+ I _p O. 't E+ R+. Note that the sequence of French+ phonemes 126 includes phonemes h and R+, which are not present in native French phoneme set, but instead are borrowed from the English phoneme set.

When the English graphemes are provided to the English to French+ phoneme mapping module 123, the module recognizes a mapping between certain English graphemes and French+ phonemes and inserts French+ phonemes when corresponding English graphemes are present in the textual input.

The combiner 128 combines the sequence of French phonemes 121 and the sequence of French+ phonemes 126 to form the combined French and French+ phonemes 130, which is provided to the waveform generator 114 to generate the synthesized speech waveform 104.

3 English to French+ Mapping

Figure 3:
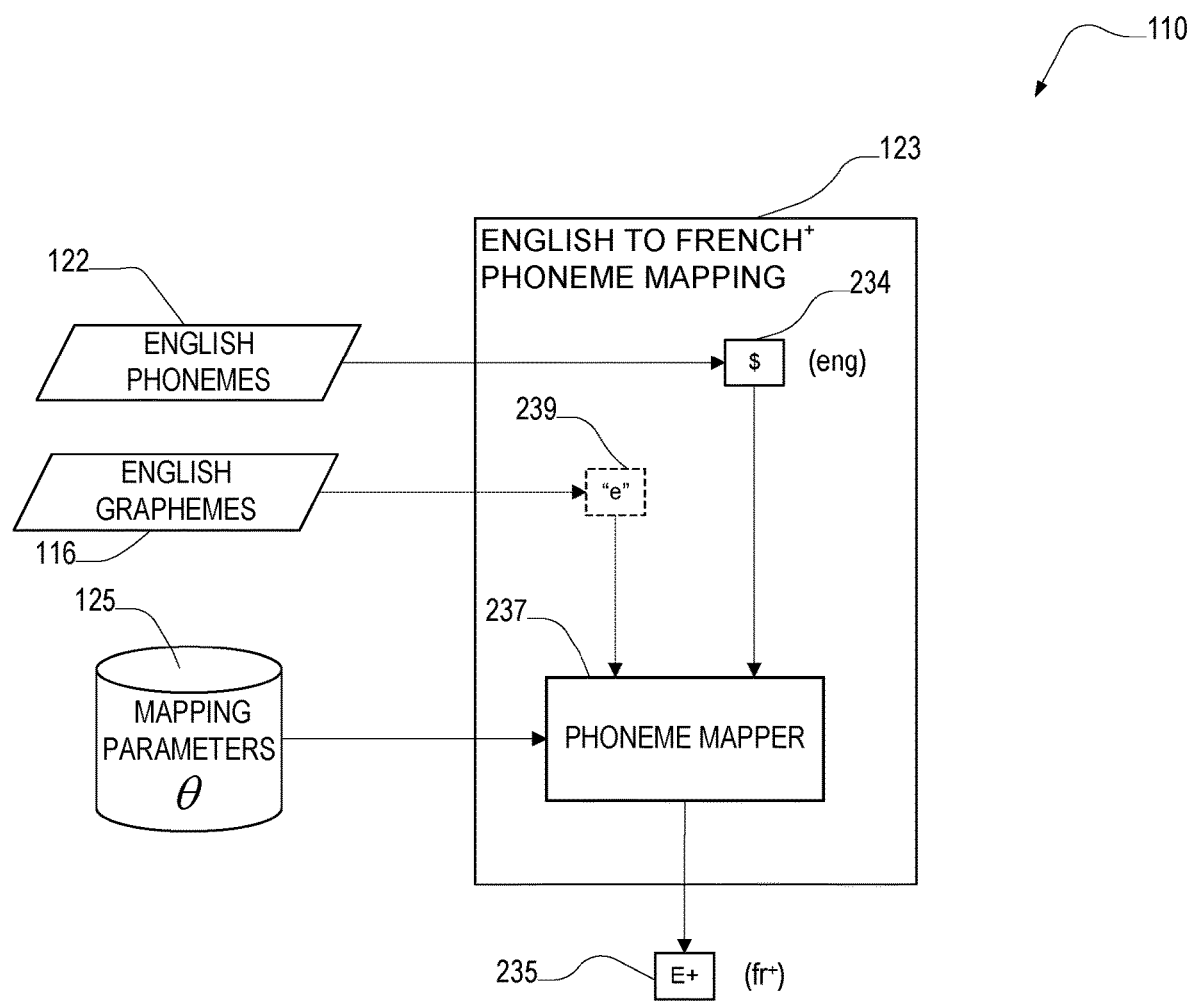
FIG. 3 is a phoneme mapping module.

Referring to FIG. 3, in some examples the English to French+ phoneme mapping module 123 receives the sequence of English phonemes 122 and, for each English phoneme, determines a corresponding mapped French+ phoneme (e.g., the mapping module 123 is a sliding mapper that is repeatedly applied to phonemes in the sequence of English phonemes 122). The module 123 includes a phoneme mapper 232 (e.g., a neural network) that is configured using mapping parameters, θ 125. The phoneme mapper 123 receives a single English phoneme 234 ($ in FIG. 3) and maps the English phoneme 234 to a (possibly Null) French+ phoneme (E+ in FIG. 3). It is noted that the mapping module 123 does not necessarily generate a single French+ phoneme based on a single English phoneme but instead may consider a context of the English phoneme and its corresponding grapheme. For example, the mapping module 123 may apply a sliding window to the sequence of English phonemes 122 and to the graphemes corresponding to the sequence of English phonemes. The information in the sliding window provides context that is used by the mapping module 123 to determine the mapping to one or more French+ phonemes.

In other examples, the English to French+ phoneme mapping module 123 implements a sequence-to-sequence mapping where a sequence of English phonemes is mapped to a sequence of French+ phonemes in a way that accounts for a context of each phoneme (and possibly grapheme) in the greater sequence of phonemes.

As is noted above, when the English graphemes are provided to the English to French+ phoneme mapping module 123, the phoneme mapper 232 is configured to identify certain English graphemes that should be replaced by French+ phonemes. For example, the phoneme mapper 232 may use the "e" grapheme 239 in its determination that the $ English phoneme 234 is mapped to the E+ French+ phoneme 235.

4 Override Mapping

Figure 4:
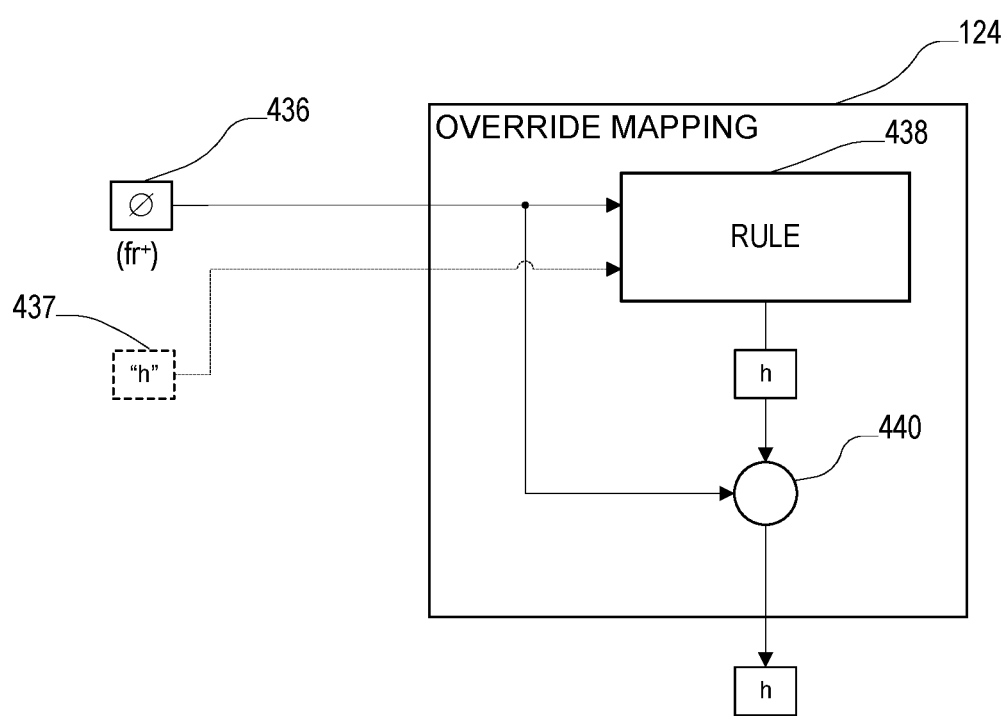
FIG. 4 is an override mapping module.

Referring to FIG. 4, in some examples, the override mapping module 124 implements rules or other heuristic techniques to identify phonemes in the sequence of French+ phonemes 126 (or lack of phonemes) that should be replaced with other, different phonemes. For example, in FIG. 4, the sequence of French+ phonemes 126 has a Null phoneme 436 mapped for an "h" English grapheme 437. A rule 438 is applied to recognize the mapping of a Null phoneme to an "h" grapheme and replace the Null phoneme with an h French⁺ phoneme. In this way, rules can be used to override the output of the English to French⁺ phoneme mapping module 123 in certain circumstances.

In FIG. 4, a decision point 440 determines whether to use the output of the rule 438 or the mapped phoneme from the sequence of French⁺ phonemes 126. For example, if the output of the rule 438 is Null, then the decision point 440 uses the mapped phoneme 436 from the sequence of French⁺ phonemes 126. Otherwise, the decision point 440 uses the output of the rule 438 and overrides the mapped phoneme 436.

5 Training

Figure 5:
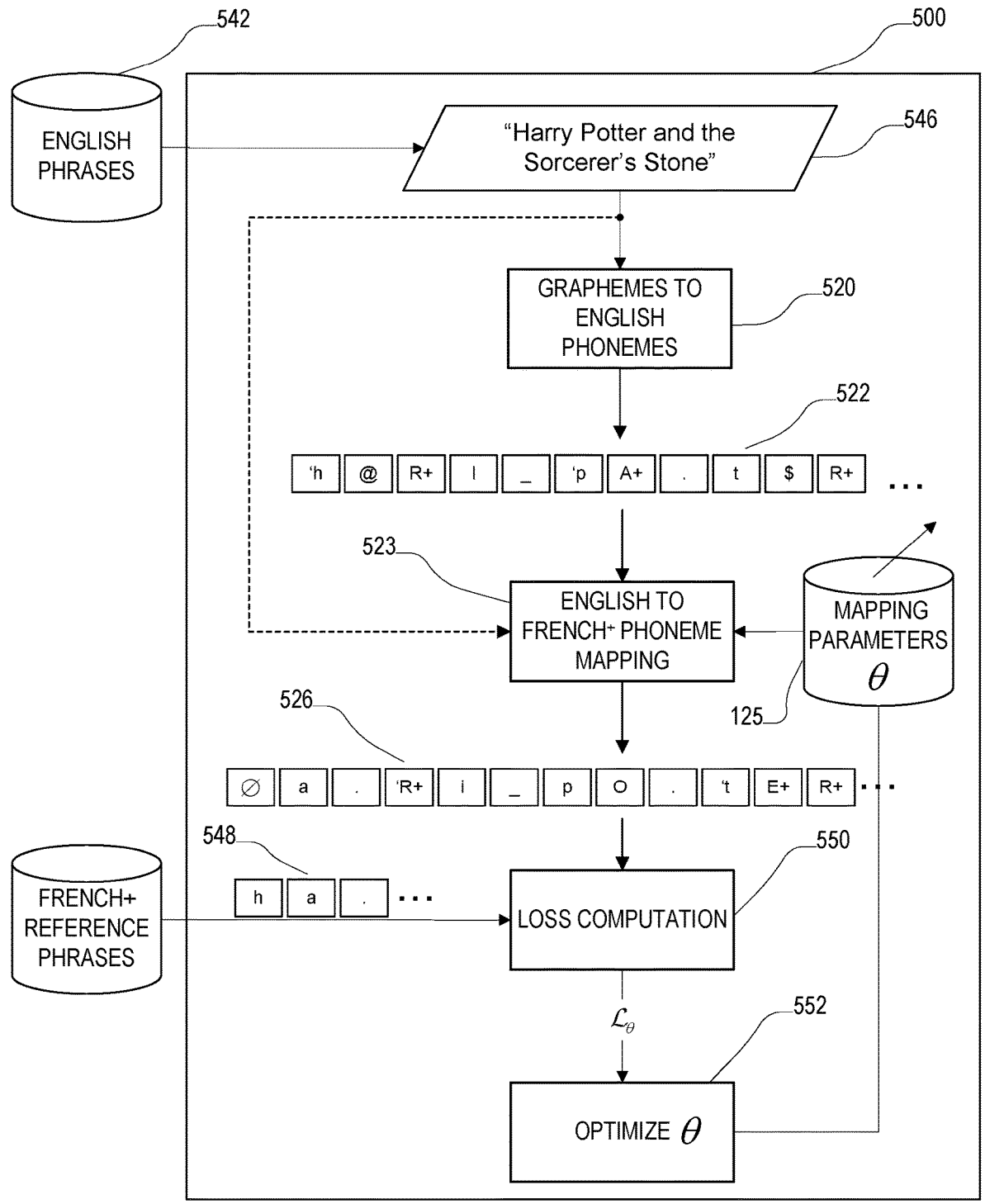
FIG. 5 is a system for training the phoneme mapping module.

Referring to FIG. 5, a training system 500 receives as input a set of textual English phrases 542 and a corresponding set of reference phrases transcribed into sequences of French⁺ phonemes 544 and processes the input to determine the mapping parameters, θ 125.

In operation, the training system 500 processes the set of textual English phrases 542 one at a time by reading a textual English phrase 546 from the set of textual English phrases 542. The textual English phrase 546 is processed by a graphemes to English phonemes module 520 to generate a sequence of English phonemes 522 corresponding to the textual English phrase 546.

The sequence of English phonemes 522 (and optionally the associated English graphemes) are provided to an English to French⁺ phoneme mapping module 523. The English to French⁺ phoneme mapping module 523 maps the sequence of English phonemes 522 to a mapped sequence of French⁺ phonemes 526 based on the current mapping parameters, θ 125.

The mapped sequence of French⁺ phonemes 526 and the reference sequence of French phonemes 548 associated with the textual English phrase 546 are provided to a loss computation module 550, which computes a loss value, $L_{74}$ characterizing a difference between the mapped sequence of French⁺ phonemes 526 and the reference sequence of French⁺ phonemes 548. The loss value, $L_\theta$ is provided to an optimization module 552, which updates the mapping parameters, θ 125 to minimize the loss value over the set of training data.

The training system 500 repeats this parameter update procedure for all of the English phrases 542, causing the mapping parameters, θ to converge.

In some examples, the reference sequences of French⁺ phonemes are aligned (automatically or manually) to the textual English phrases (or the corresponding sequences of English phonemes) to improve training performance.

In some examples, each reference sequence of French⁺ phonemes is hand transcribed. In other examples, each reference sequence of French⁺ phonemes is generated by performing phoneme recognition using a French⁺ phoneme set on speech from typical French speakers. In such examples, the mapping parameters, θ will configure the mapper to mimic the population of French speakers used to generate the training data (i.e., a population of French speakers who are fluent in English would result in different mapping behavior than a population of French speakers who are only familiar with the English language).

In other examples, each reference sequence of French⁺ phonemes is generated by performing phoneme recognition using a French⁺ phoneme set on speech spoken by a French speaker reading the English phrases.

6 Alternatives

The examples described above use a neural network and optionally rules to map English phonemes into an augmented French phoneme set (French⁺). However, in some examples, no neural network is used, and a rule-based approach is sufficient. Alternatively, other machine learning approaches, such as use of a decision tree, may be used instead of a neural network.

The examples described above map English phonemes into phonemes in an augment French phoneme set. However, it isn't required that the French phoneme set is augmented—the native French phoneme set may include sufficient phonemes for training a mapper to generate speech that imitates a native French speaker who is attempting to pronounce English words.

While the system described above produces a waveform for presentation as an acoustic signal, the output may comprise a representation from which the waveform may be generated. For example, the phoneme sequence may be processed to form a spectrogram (energy vs. frequency vs. time) from which the waveform may be determined in a language-independent manner.

Alternative mappings approaches may be used to process the foreign phoneme sequence to form the target phoneme sequence. For example, a sequence-to-sequence neural network (e.g., a Transformer Neural Network or a Recurrent Neural Network, such as an LSTM) may be used. Alternative training approaches may be used, with the target phoneme sequence being determined by phoneme recognition by one or a combination of native speakers uttering the foreign fragments, hand transcription of such native speaker's utterances. Furthermore, the mapping may be trained to directly match the audio of the native speakers.

In alternative approach, different foreign fragments may be processed differently, for example, according to their length. For example, it may be that short fragments are mapped closed to the native language while longer fragments retain more of their proper foreign pronunciation. Similarly, named entities may retain their proper pronunciation more than common expressions. Therefore, alternatively may have a mapping process that can vary the degree to which the foreign fragment is mapped to the native pronunciation. Furthermore, users may have a preference for the degree of "nativization" of a pronunciations, which may be settable to by the user.

In some examples, lexica are used to override at least some part of the mapping of the English phonemes into the augmented French phoneme set (French⁺) in the case of exceptions that are not properly captured by the neural network or rule-based mapping.

As is noted above, in some examples, graphemes and phonemes are aligned prior to processing using a classification model or rule-based mapper. Different types of grapheme-phoneme alignment techniques can be used such as Expectation Maximization-based alignment, phonetic similarity-based alignment, constraint-based alignment, using an Integer Programming framework, alignment by aggregation (i.e., a combination of integer programming and expectation maximization) or any other suitable alignment technique.

7 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for synthesizing speech from a textual input, the method comprising:
   receiving the textual input, the textual input including native words in a native language and foreign words in a foreign language;
   processing the textual input to determine a phonetic representation of the textual input, the processing including:
   determining a native phonetic representation of the of the native words, and
   determining a nativized phonetic representation of the foreign words, determining the nativized phonetic representation including:
   forming a foreign phonetic representation of the foreign words using a foreign phoneme set, and
   mapping the foreign phonetic representation to the nativized phonetic representation according to a model of a native speaker's pronunciation of foreign words;
   providing a combination of the native phonetic representation of the native words and the nativized phonetic representation of the foreign words to a waveform synthesizer for synthesis of a speech waveform; and
   providing the speech waveform for acoustic presentation to a user by a loudspeaker;
   wherein the nativized phonetic representation comprises a combination of phonemes from a native phoneme set and phonemes from the foreign phoneme set.

2. The method of claim 1 wherein the native phonetic representation comprises phonemes from a native phoneme set.

3. The method of claim 1 wherein the mapping of the foreign phonetic representation to the nativized phonetic representation uses contextual information associated with the foreign phonetic representation, and wherein the contextual information includes a grapheme representation of the foreign text associated with the foreign phonetic representation.

4. The method of claim 3 wherein the contextual information further includes an alignment of graphemes in the grapheme representation of the foreign text to phonemes in the foreign phonetic representation.

5. The method of claim 3 wherein the contextual information includes location information of phonemes in the foreign phonetic representation.

6. The method of claim 1 wherein the model of the native speaker's pronunciation of foreign words is based on training data comprising foreign textual phrases and phonetic transcriptions of a native speaker's pronunciation of the foreign textual phrases.

7. The method of claim 6 wherein at least some of the native speaker's pronunciations of foreign textual phrases are mispronunciations.

8. The method of claim 1 further comprising synthesizing the speech waveform based on the combination of the native phonetic representation of the of the native words and the nativized phonetic representation of the foreign words using the waveform synthesizer.

9. The method of claim 1 further comprising configuring a neural network according to the model of a native speaker's pronunciation of foreign words.

10. The method of claim 1 wherein mapping the foreign phonetic representation to the nativized phonetic representation according to the model of a native speaker's pronunciation of foreign words includes applying one or more mapping rules.

11. The method of claim 1 further comprising identifying the foreign words in the textual input.

12. A system for synthesizing speech from a textual input, the system comprising:
   an input for receiving the textual input, the textual input including native words in a native language and foreign words in a foreign language;

one or more processors configured to process the textual input to determine a phonetic representation of the textual input, the processing including:
  determining a native phonetic representation of the of the native words, and
  determining a nativized phonetic representation of the foreign words, determining the nativized phonetic representation including:
    forming a foreign phonetic representation of the foreign words using a foreign phoneme set, and
    mapping the foreign phonetic representation to the nativized phonetic representation according to a model of a native speaker's pronunciation of foreign words;
  providing a combination of the native phonetic representation of the native words and the nativized phonetic representation of the foreign words to a waveform synthesizer for synthesis of a speech waveform; and
  providing the speech waveform for acoustic presentation to a user by a loudspeaker;
  wherein the nativized phonetic representation comprises a combination of phonemes from a native phoneme set and phonemes from the foreign phoneme set.

13. Software stored in a non-transitory form on a computer-readable medium, the software including instructions for causing a computing system to synthesize speech from a textual input including:
  receive the textual input, the textual input including native words in a native language and foreign words in a foreign language;
  process the textual input to determine a phonetic representation of the textual input, the processing including:
    determining a native phonetic representation of the of the native words, and
    determining a nativized phonetic representation of the foreign words, determining the nativized phonetic representation including:
      forming a foreign phonetic representation of the foreign words using a foreign phoneme set, and
      mapping the foreign phonetic representation to the nativized phonetic representation according to a model of a native speaker's pronunciation of foreign words;
  providing a combination of the native phonetic representation of the native words and the nativized phonetic representation of the foreign words to a waveform synthesizer for synthesis of a speech waveform; and
  providing the speech waveform for acoustic presentation to a user by a loudspeaker;
  wherein the nativized phonetic representation comprises a combination of phonemes from a native phoneme set and further comprises phonemes from the foreign phoneme set a second set of phonemes different from the native phoneme set.

14. A method for synthesizing speech from a textual input, the method comprising:
  receiving the textual input, the textual input including native words in a native language and foreign words in a foreign language;
  processing the textual input to determine a phonetic representation of the textual input, the processing including
    determining a native phonetic representation of the of the native words, and
    determining a nativized phonetic representation of the foreign words including
      forming a foreign phonetic representation of the foreign words using a foreign phoneme set, and
      mapping the foreign phonetic representation to the nativized phonetic representation according to a model of a native speaker's pronunciation of foreign words,
  providing a combination of the native phonetic representation of the native words and the nativized phonetic representation of the foreign words to a waveform synthesizer for synthesis of a speech waveform; and
  providing the speech waveform for acoustic presentation to a user by a loudspeaker;
  wherein the nativized phonetic representation comprises a combination of phonemes from a native phoneme set and phonemes from the foreign phoneme set, the mapping of the foreign phonetic representation to the nativized phonetic representation uses contextual information associated with the foreign phonetic representation, and the contextual information includes a grapheme representation of the foreign text associated with the foreign phonetic representation.

15. The method of claim 1, wherein the model is a trained neural network sequence-to-sequence model, and the mapping of the foreign phonetic representation comprises providing said representation to an input of the neural network model, and obtaining the nativized phonetic representation as an output of the neural network model.

16. The method of claim 6, wherein the model is a trained neural network sequence-to- sequence model, and the method further comprises training said model using the training data.

17. The method of claim 1, wherein the mapping of the foreign phonetic representation is performed according to user preference for a degree of nativization.

* * * * *